(12) United States Patent
Watanabe et al.

(10) Patent No.: US 11,292,207 B2
(45) Date of Patent: Apr. 5, 2022

(54) JOINED BODY AND ACCELERATOR DEVICE USING THE JOINED BODY

(71) Applicant: DENSO CORPORATION, Kariya (JP)

(72) Inventors: Hidekazu Watanabe, Kariya (JP); Haruhiko Suzuki, Kariya (JP); Takehiro Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 170 days.

(21) Appl. No.: 15/566,358

(22) PCT Filed: Apr. 5, 2016

(86) PCT No.: PCT/JP2016/001906
§ 371 (c)(1),
(2) Date: Oct. 13, 2017

(87) PCT Pub. No.: WO2016/189790
PCT Pub. Date: Dec. 1, 2016

(65) Prior Publication Data
US 2018/0257311 A1  Sep. 13, 2018

(30) Foreign Application Priority Data

May 27, 2015 (JP) .............................. JP2015-107203

(51) Int. Cl.
*B60K 26/02* (2006.01)
*B29C 65/56* (2006.01)
*B29C 65/00* (2006.01)

(52) U.S. Cl.
CPC ...... *B29C 65/565* (2013.01); *B29C 66/53241* (2013.01); *B60K 26/02* (2013.01)

(58) Field of Classification Search
CPC ........................ B29C 65/565; B29C 66/53241
See application file for complete search history.

(56) References Cited

U.S. PATENT DOCUMENTS 3,648,492 A * 3/1972 Walters ................. E05B 27/083
70/491
3,789,638 A * 2/1974 Roberts ................. E05B 21/066
70/366

(Continued)

FOREIGN PATENT DOCUMENTS

| CN | 201486965 | 5/2010 |
| CN | 201507511 | 6/2010 |
| JP | 2009-148998 | 7/2009 |

OTHER PUBLICATIONS

"Mdmetric"—https://mdmetric.com/fastindx/uj2-117-121.pdf Maryland Metrics Fastener Catalog—Chapter J2, Dec. 2012 (Year: 2012).*

(Continued)

*Primary Examiner* — Nicholas R Krasnow
(74) *Attorney, Agent, or Firm* — Nixon & Vanderhye P.C.

(57) ABSTRACT

A joined body includes: a first member having a hole; and a second member that is press-fitted to the hole. The second member has a second abutment surface abutting against a first abutment surface which is an inner wall of the first member forming the hole. A groove portion is defined on one of an inner wall of the first member and an outer wall of the second member, and has a groove formed to extend in a press-fitting direction of the second member to the first member. An insertion portion is formed to protrude in a radial direction from the other of the inner wall of the first member and the outer wall of the second member, and is inserted in the groove. The groove portion has an engagement portion that is able to be engaged with an end portion of the insertion portion in the press-fitting direction.

14 Claims, 9 Drawing Sheets

(56) References Cited

U.S. PATENT DOCUMENTS

| | | | | |
|---|---|---|---|---|
| 3,853,416 A * | 12/1974 | Hanan | ................ | A44C 17/0208 403/322.1 |
| 4,171,939 A * | 10/1979 | Harwath | ............. | F04C 15/0073 403/354 |
| 4,761,978 A * | 8/1988 | Walla | ...................... | E05B 9/086 70/367 |
| 5,573,311 A | 11/1996 | Clohessy | | |
| 5,613,405 A * | 3/1997 | Kelley | ................... | F16C 1/103 74/501.5 R |
| 6,138,646 A * | 10/2000 | Hansen | ................... | F02B 33/38 123/559.1 |
| 6,435,017 B1 * | 8/2002 | Nowicki, Jr. | ....... | G01L 19/0007 403/93 |
| 6,474,193 B1 * | 11/2002 | Farney | ............... | A63B 22/0605 74/594.3 |
| 2002/0073754 A1 * | 6/2002 | Katagiri | ............... | E05B 17/041 70/379 R |
| 2004/0037633 A1 * | 2/2004 | Kleiner | ................ | B23B 31/117 403/345 |
| 2006/0207304 A1 * | 9/2006 | Widen | ............... | E05B 19/0023 70/494 |
| 2010/0143030 A1 * | 6/2010 | Tanaka | ................. | F16D 1/0876 403/356 |
| 2013/0049552 A1 * | 2/2013 | Hatch | ................... | H02K 11/21 310/68 B |
| 2013/0238035 A1 * | 9/2013 | Medoff | ................ | A61B 17/809 606/297 |
| 2015/0007684 A1 | 1/2015 | Saito et al. | | |
| 2015/0101432 A1 * | 4/2015 | Gao | ......................... | F16H 1/28 74/405 |
| 2015/0267623 A1 | 9/2015 | Ooya et al. | | |
| 2015/0338775 A1 * | 11/2015 | Hosokawa | ......... | G03G 15/0868 399/258 |
| 2017/0073166 A1 * | 3/2017 | Soderstrom | ............ | B65G 23/06 |
| 2017/0106431 A1 * | 4/2017 | Yamagata | ................ | B21J 5/025 |
| 2017/0340449 A1 * | 11/2017 | Deransart | ............ | A61F 2/4014 |
| 2018/0230866 A1 * | 8/2018 | Caputo | ................ | F01L 1/3442 |
| 2019/0299221 A1 * | 10/2019 | Tomaru | .................... | B04B 9/12 |

OTHER PUBLICATIONS

BASF—http://www2.basf.us//PLASTICSWEB/displayanyfile?id=0901a5e1801499d5 (Year: 2007).*

Bayer—https://cdn.sparkfun.com/assets/home_page_posts/1/4/1/0/Plastic_Snap_fit_design.pdf (Year: 2014).*

Decker KH, Kabus KH (2002) Maschinenelemente—Funktion, Gestaltung und Berechnung. 15 Aufl, Carl Hanser Verlag, München, ISBN 3-446-21525-5, 2002 (2 pgs.).

International Search Report for PCT/JP2016/001906, dated Jun. 28, 2016, 4 pages.

* cited by examiner

JOINED BODY AND ACCELERATOR DEVICE USING THE JOINED BODY

CROSS REFERENCE TO RELATED APPLICATION

This application is the U.S. national phase of International Application No. PCT/JP2016/001906 filed Apr. 5, 2016 which designated the U.S. and claims priority to Japanese Patent Application No. 2015-107203 filed on May 27, 2015, the entire contents of each of which are incorporated herein by reference.

TECHNICAL FIELD

The present disclosure relates to a joined body and an accelerator device using the joined body.

BACKGROUND ART

In a joined body in which two members are joined by press-fitting, a restoring force of one of the two members that is press-fitted to a hole provided in the other member is applied to a portion where the one member and the other member abut against each other, so as to regulate relative movement of the one member to the other member, the restoring force causing the one member to attempt to return to an original shape. For example, a joined body that includes: a main body that has a hole; and a cylindrical member that is formed in a cylindrical shape and is press-fitted to the hole is described in Patent Literature 1.

PRIOR ART LITERATURES

Patent Literature

Patent Literature 1: JP 2009-148998 A

SUMMARY OF INVENTION

The cylindrical member that is provided in the joined body described in Patent Literature 1 has: an abutment surface on an radially outer side, the abutment surface abutting against an inner wall of the hole; and an inclined surface that is formed at an outer edge part of one end portion to approach a center axis of the cylindrical member as separating from a side connected to the abutment surface. In the joined body described in Patent Literature 1, when the cylindrical body that is press-fitted to the hole attempts to return to an original shape, the inclined surface is engaged with an inner edge portion of the main body formed with the hole, so as to regulate relative movement of the cylindrical member to the main body in a press-fitting direction. At this time, as a deformation amount of the cylindrical body is increased, a joined force between the main body and the cylindrical member is increased. In order to achieve the above, a diameter of the cylindrical member, that is, a press-fitted margin thereof has to be relatively increased. However, when the press-fitted margin is relatively increased, the cylindrical member is possibly damaged by press-fitting.

The present disclosure has a purpose of providing a joined body, for which plural members are reliably press-fitted and joined without being influenced by size of the members, and an accelerator device using the joined body.

According to an aspect of the present disclosure, a joined body includes: a first member, a second member, a groove portion, an insertion portion, and an engagement portion.

The first member has a hole.

The second member has a second abutment surface abutting against an inner wall of the first member forming the hole, and is press-fitted to the hole.

The groove portion is defined on one of an inner wall of the first member differing from the first abutment surface and an outer wall of the second member differing from the second abutment surface, and has a groove formed to extend in a press-fitting direction of the second member to the first member.

The insertion portion is formed to protrude in a radial direction from the other of the inner wall of the first member differing from the first abutment surface and the outer wall of the second member differing from the second abutment surface, and is inserted in the groove.

The engagement portion is defined in the groove portion, and is able to be engaged with an end portion of the insertion portion in the press-fitting direction.

The joined body includes a groove portion having a groove that is formed in the first member or the second member in a manner to extend in a press-fitting direction of the second member to the first member. The groove portion is provided on an inner wall of the first member differing from the first abutment surface of the first member or an outer wall of the second member differing from the second abutment surface of the second member. The insertion portion is formed to protrude in a radial direction from the outer wall of the second member differing from the second abutment surface or the inner wall of the first member differing from the first abutment surface and is inserted in the groove. In this way, the insertion portion and the groove portion are engaged with each other, and thus relative rotation of the second member to the first member can be regulated even when the second member attempts to rotate relative to the first member.

The groove portion is provided with an engagement portion that can be engaged with an end portion of the insertion portion in the press-fitting direction. In this way, the engagement portion and the insertion portion are engaged with each other even when the second member moves relative to the first member in the press-fitting direction, and thus relative movement of the second member to the first member in the press-fitting direction can be regulated.

According to the present disclosure, the relative rotation and the relative movement in the press-fitting direction of the second member to the first member can reliably be regulated, compared with a case where the two members are press-fitted and joined only by a restoring force of the second member press-fitted to the hole by the groove portion, the insertion portion, and the engagement portion, which are provided at a different position from the first abutment surface of the first member or the second abutment surface of the second member. In this way, regardless of a press-fitted margin that determines the magnitude of the restoring force of the second member, the first member and the second member can reliably be press-fitted and joined.

DESCRIPTION OF EMBODIMENTS

Figure 1:
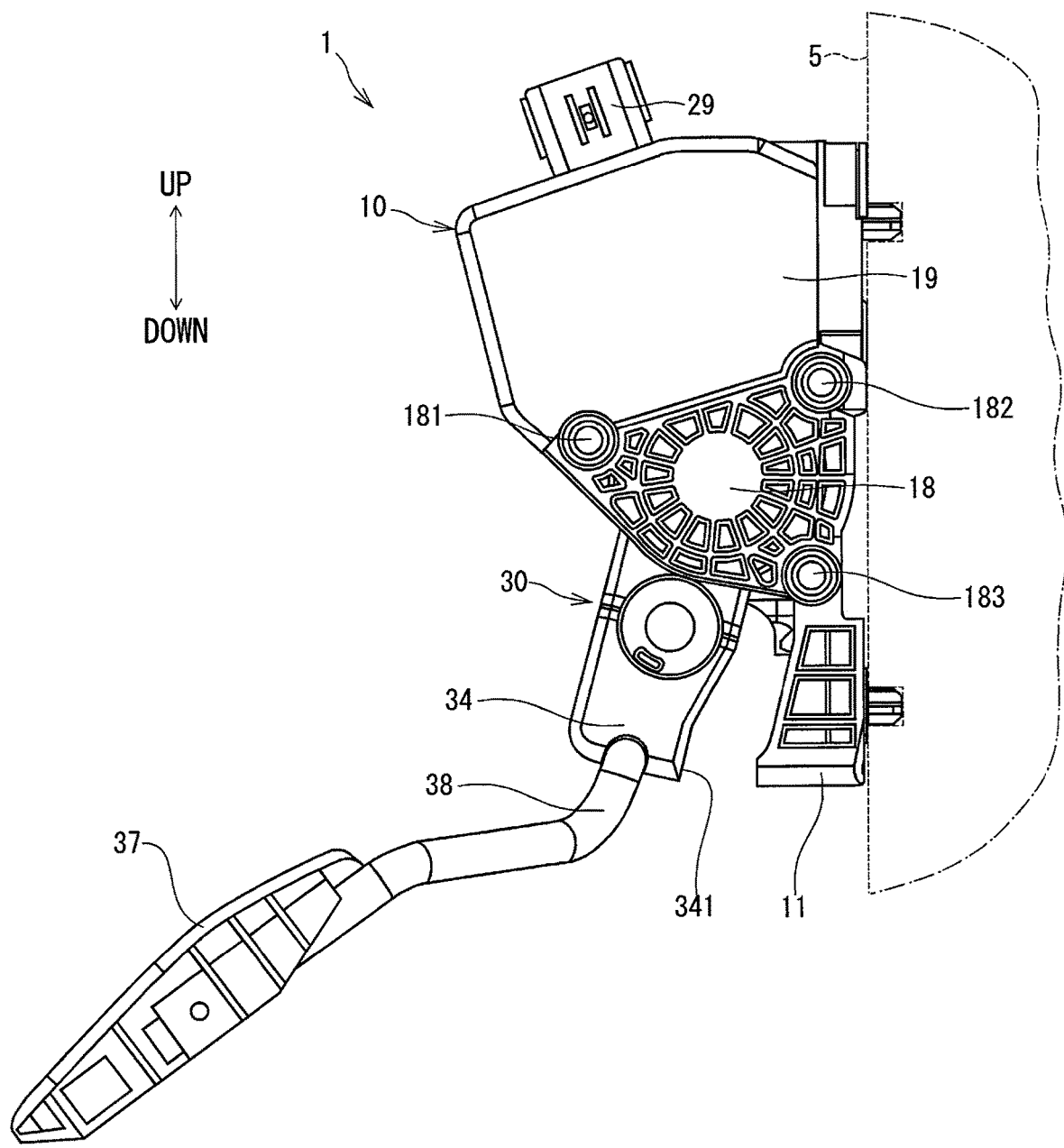
FIG. 1 is a schematic view of an accelerator device according to a first embodiment.

A description will hereinafter be made on embodiments on the basis of the drawings.

First Embodiment

A description will be made on an accelerator device according to a first embodiment on the basis of FIGS. 1 to 7. An accelerator device 1 according to the first embodiment is an input device that is operated by a driver of a vehicle to determine a valve opening degree of a throttle valve for a vehicular engine, which is not depicted. The accelerator device 1 is of an electronic type and transmits an electric signal based on a depression amount of an accelerator pedal 37 to an electronic control device, which is not depicted. The electronic control device drives the throttle valve by using a throttle actuator, which is not depicted, on the basis of the depression amount and other information.

The accelerator device 1 includes a housing 10 corresponding to "a support portion", a first cover 18, a second cover 19, a shaft 20, an operation member 30, the accelerator pedal 37, a pedal arm 38, a pedal spring 39 corresponding to "an urging member", a rotation angle sensor 25 corresponding to "a rotation angle detection unit", and a hysteresis mechanism portion 40. Hereinafter, an upper side in FIGS. 1 to 3 and a lower side in FIGS. 1 to 3 will respectively be described as a "up" and a "down". However, the up-down direction in the accelerator device 1 is not limited thereto. The shaft 20 and the operation member 30 correspond to "a joined body".

The housing 10 is formed in a bottomed cylindrical shape and is made of resin. The housing 10 is attached to a vehicle body 5 by three fixation bases 111, 112, 113 so as to be opened in a horizontal direction. The housing 10 has an internal space 100 that houses the shaft 20, the pedal spring 39, a part of the rotation angle sensor 25, the hysteresis mechanism portion 40, and the like. The housing 10 has a communication hole 101 on the bottom side. The communication hole 101 makes the internal space 100 communicate with outside and corresponds to a movable range of the operation member 30. On the bottom side of the communication hole 101, the housing 10 is provided with a fully opened stopper portion 11 that regulates rotation of the operation member 30, the shaft 20, which integrally rotates with the operation member 30, and the like at an accelerator fully opened position. The accelerator fully opened position is a position set such that a degree of depression of the accelerator pedal 37 by the driver, that is, an accelerator opening degree becomes 100[%].

The first cover 18 and the second cover 19 are provided to cover an opening of the housing 10. The internal space 100 communicates with the outside only via the communication hole 101 due to the housing 10, the first cover 18, and the second cover 19. The first cover 18 is fixed to the housing 10 by bolts 181, 182, 183. The second cover 19 is locked to the first cover 18. The first cover 18 and the second cover 19 prevents entry of a foreign substance into the internal space 100.

The shaft 20 is substantially formed in a rod shape and is rotatably provided in the internal space 100. The shaft 20 has a shaft portion 21 corresponding to "a second member", a groove portion 22, a sensor housing portion 23 corresponding to "a regulation portion", a shaft engagement portion 24 corresponding to "an engagement portion", and the like. The shaft portion 21, the groove portion 22, the sensor housing portion 23, and the shaft engagement portion 24 are integrally formed of the resin.

Figure 2:
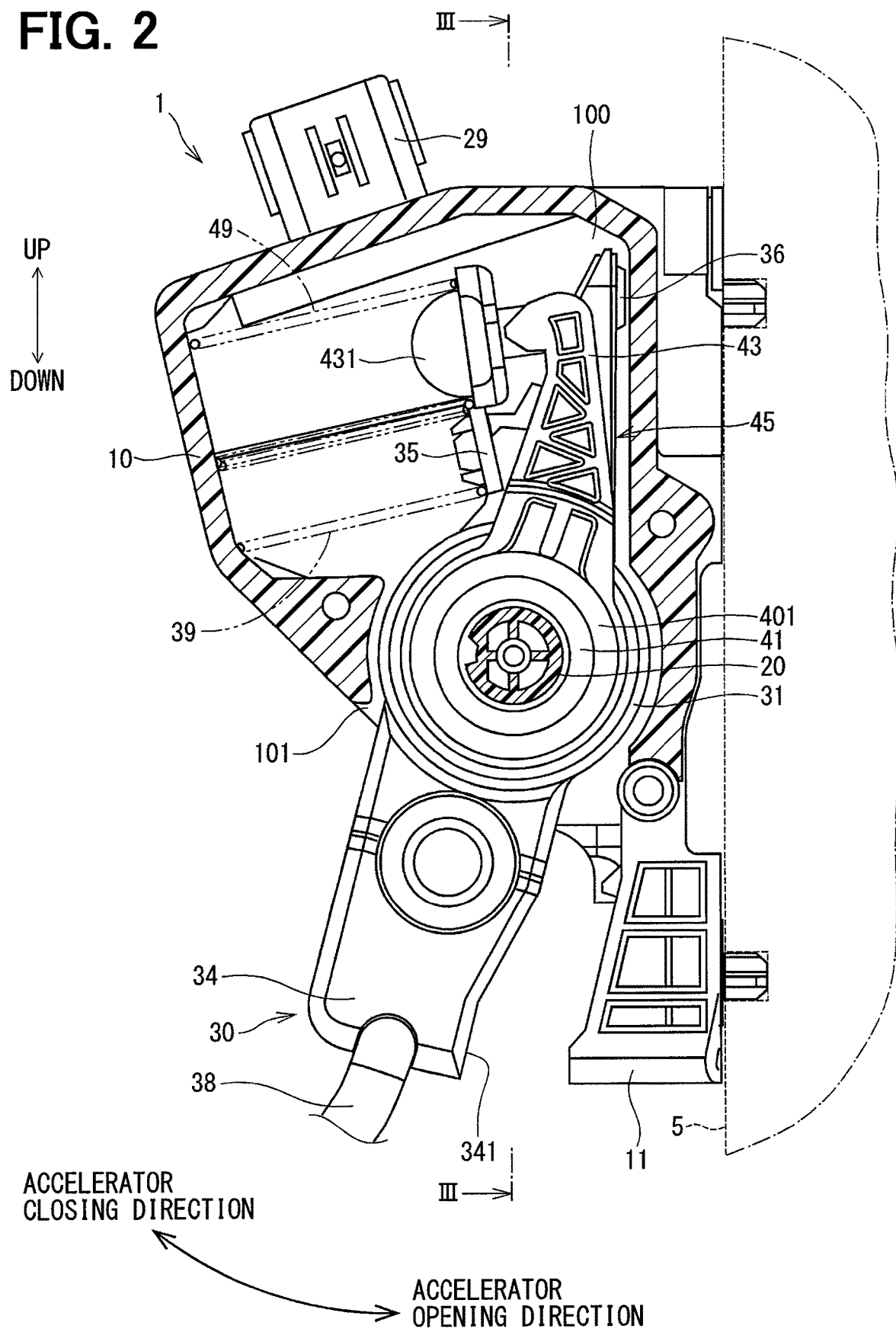
FIG. 2 is a cross-sectional view of the accelerator device according to the first embodiment.
Figure 3:
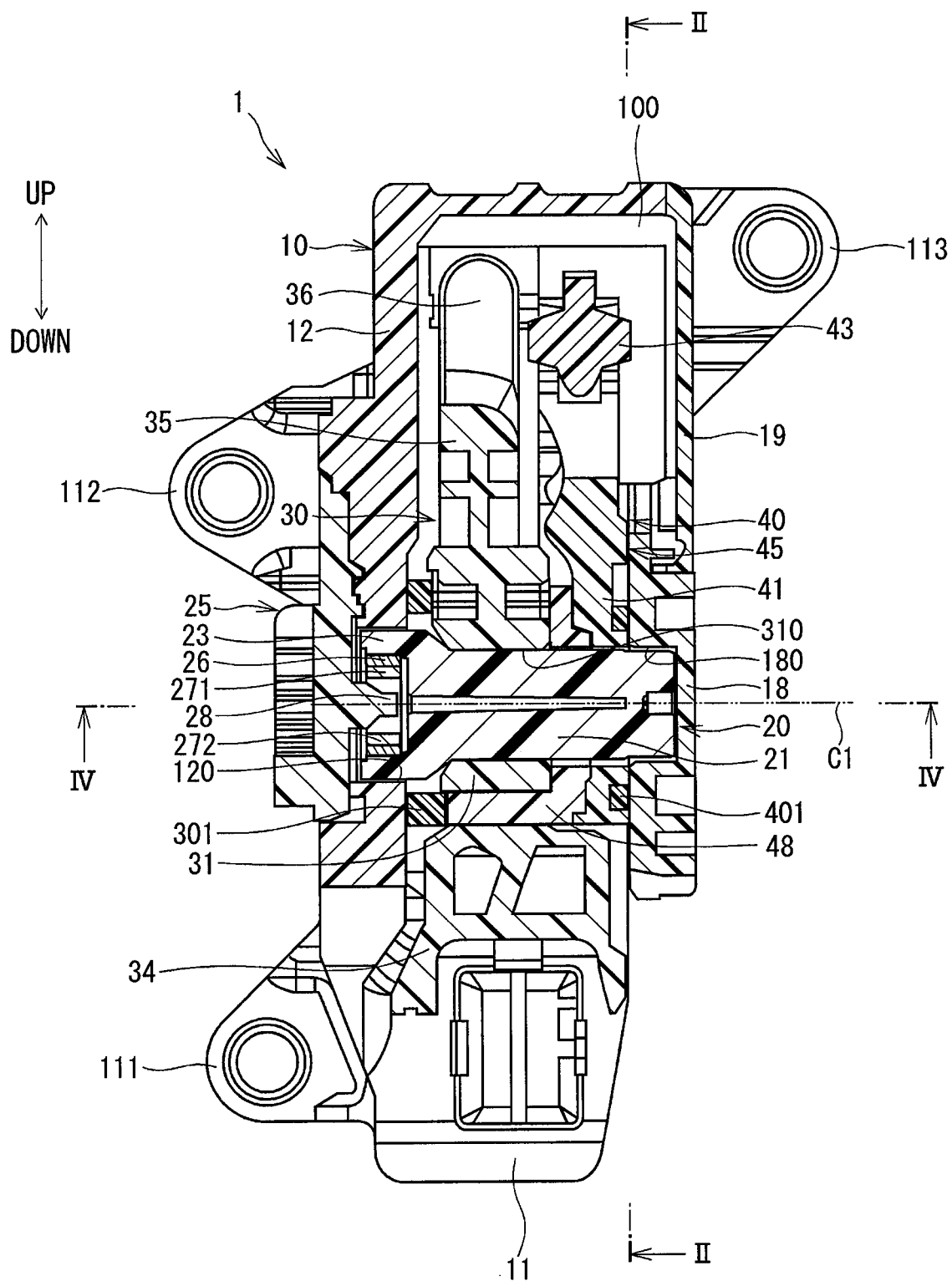
FIG. 3 is a cross-sectional view taken along a line III-III in FIG. 2.
Figure 4:
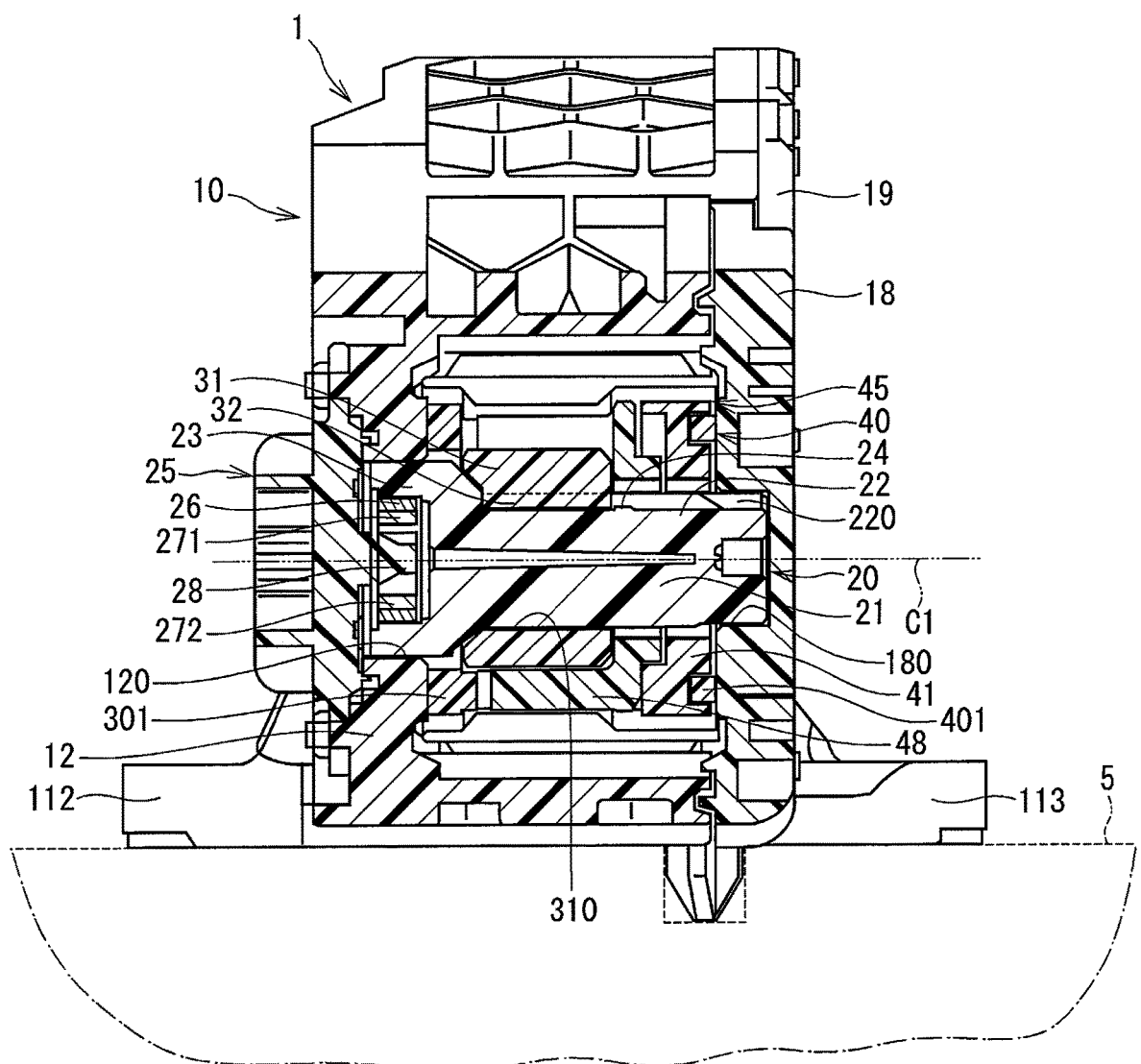
FIG. 4 is a cross-sectional view taken along a line IV-IV in FIG. 3.

In accordance with torque that is received from the operation member 30 in conjunction with a depressing operation by the driver, the shaft 20 rotates within a predetermined angle range from an accelerator fully closed position to the accelerator fully opened position. The accelerator fully closed position is a position set such that the degree of the depression of the accelerator pedal 37 by the driver, that is, the accelerator opening degree becomes 0[%]. Hereinafter, as depicted in FIG. 2, a rotation direction in which the operation member 30 moves from the accelerator fully closed position to the accelerator fully opened position side will be described as an "accelerator opening direction". Meanwhile, a rotation direction in which the operation member 30 moves from the accelerator fully opened position to the accelerator fully closed position side will be described as an "accelerator closing direction". A detailed description on the shape of the shaft 20 will be made below.

The operation member 30 includes a pedal boss portion 31 corresponding to "a first member", an insertion portion 32, an arm coupling portion 34, a pedal spring receiving portion 35, and a fully closed stopper portion 36. The pedal boss portion 31, the insertion portion 32, the arm coupling portion 34, the pedal spring receiving portion 35, and the fully closed stopper portion 36 are integrally formed of the resin.

The pedal boss portion 31 is provided between a bottom portion 12 of the housing 10, which forms a bottom of the internal space 100, and the first cover 18. The pedal boss portion 31 is formed in a substantially ring shape and has an insertion hole 310 corresponding to "a hole" through which the shaft 20 can be inserted. The insertion portion 32 is provided on an inner wall of the insertion hole 310 (see FIG. 4). A detailed description on a shape of the insertion portion 32 will be made below.

A first helical tooth, which is not depicted, is integrally formed on the first cover 18 side of the pedal boss portion 31. The plural first helical teeth are provided at equally-spaced intervals in a circumferential direction. In the circumferential direction, each of the first helical teeth protrudes toward a hysteresis rotation member 45 of the hysteresis mechanism portion 40 as moving in the accelerator closing direction and has an inclined surface in a tip portion thereof, the inclined surface approaching the hysteresis rotation member 45 as moving in the accelerator closing direction.

A first friction member 301 is provided between the pedal boss portion 31 and the bottom portion 12. The first friction member 301 is provided on a radially outer side of the shaft 20. When being pushed toward the bottom portion 12, the pedal boss portion 31 is frictionally engaged with the first friction member 301.

The arm coupling portion 34 is formed such that one end thereof is connected to an outer wall on the radially outer side of the pedal boss portion 31 and that the other end thereof passes through the communication hole 101 and extends to the bottom side of the housing 10. The other end of the arm coupling portion 34 is connected to the pedal arm 38. An end surface 341 on the accelerator opening direction side of the arm coupling portion 34 can abut against the fully opened stopper portion 11.

The pedal spring receiving portion 35 is provided such that one end thereof is connected to the outer wall on the radially outer side of the pedal boss portion 31 and that the other end thereof extends in the top direction within the internal space 100. The pedal spring receiving portion 35 locks one end portion of the pedal spring 39.

The fully closed stopper portion 36 is formed to further extend in the top direction from the pedal spring receiving portion 35. The fully closed stopper portion 36 is formed in a manner capable of abutting against an inner wall of the housing 10. The fully closed stopper portion 36 regulates the rotation of the operation member 30 in the accelerator closing direction at the accelerator fully closed position.

The shaft 20 and the operation member 30 are joined when the shaft 20 is press-fitted to the insertion hole 310 provided in the pedal boss portion 31. A detailed description on a joined state of the shaft 20 and the operation member 30 will be made below.

The accelerator pedal 37 is connected to one end portion of the pedal arm 38. The other end portion of the pedal arm 38 is fixed to the other end of the arm coupling portion 34. The accelerator pedal 37 converts the depression by the driver to rotational torque about a rotation axis C1 of the shaft 20 and transmits the rotational torque to the shaft 20.

When the accelerator pedal 37 rotates in the accelerator opening direction, a rotation angle of the shaft 20 in the accelerator opening direction with the accelerator fully closed position being a base point is increased. Corresponding to the rotation angle of the shaft 20 in the accelerator opening direction, the accelerator opening degree is increased. Meanwhile, when the accelerator pedal 37 rotates in the accelerator closing direction, the rotation angle of the shaft 20 in the accelerator closing direction is reduced. Corresponding to the rotation angle of the shaft 20 in the accelerator closing direction, the accelerator opening degree is reduced.

The pedal spring 39 is a coil spring, for example, and urges the operation member 30 in the accelerator closing direction. An urging force that is applied to the operation member 30 by the pedal spring 39 is increased as a rotation angle of the operation member 30, that is, the rotation angle of the shaft 20 is increased. In addition, the urging force is set such that the operation member 30 and the shaft 20 can be restored at the accelerator fully closed position regardless of the rotation angle of the operation member 30.

The rotation angle sensor 25 is configured by including a yoke 26, a pair of magnets 271, 272 with different magnetic poles, a hall element 28, and the like. The yoke 26 formed of a magnetic body is fixed to inside of the sensor housing portion 23. The magnets 271, 272 are fixed to oppose each other with the rotation axis C1 of the shaft 20 being interposed therebetween in a radially inner direction of the yoke 26. The hall element 28 is provided between the magnet 271 and the magnet 272.

The rotation angle sensor 25 detects a voltage that is generated in the hall element 28 in accordance with a change of a magnetic field so as to detect a relative rotation angle between the hall element 28 and the magnets 271, 272, that is, the rotation angle of the shaft 20 with respect to the housing 10. The rotation angle sensor 25 transmits the electric signal based on the detected rotation angle to the non-illustrated electronic control device on the outside via an external connector 29 provided on top of the accelerator device 1.

The hysteresis mechanism portion 40 includes: the hysteresis rotation member 45 that is integrally formed with a hysteresis boss portion 41, a hysteresis spring receiving portion 43, and the like; an intermediate member 48; a second friction member 401; and a hysteresis spring 49.

The hysteresis boss portion 41 is provided between the pedal boss portion 31 and the first cover 18 in a radially outer direction of the shaft 20. The hysteresis boss portion 41 can rotate relative to the shaft 20 and the pedal boss portion 31 and can approach or separate from the pedal boss portion 31.

In the internal space 100, the hysteresis spring receiving portion 43 is formed to extend in the top direction from the hysteresis boss portion 41. The hysteresis spring receiving portion 43 has a locking portion 431 in an end portion on an opposite side from a side connected to the hysteresis boss portion 41, the locking portion 431 locking one end portion of the hysteresis spring 49.

The intermediate member 48 is provided between the hysteresis boss portion 41 and the pedal boss portion 31. The intermediate member 48 can rotate relative to the shaft 20 and the pedal boss portion 31 in an integral manner with the hysteresis rotation member 45 and can approach or separate from the pedal boss portion 31. A second helical tooth, which is not depicted, is integrally formed on the pedal boss portion 31 side of the intermediate member 48. The plural second helical teeth are provided at equally-spaced intervals in the circumferential direction. In the circumferential direction, each of the second helical teeth protrudes to the pedal boss portion 31 side as moving in the accelerator opening direction and has an inclined surface in a tip portion thereof, the inclined surface approaching the hysteresis boss portion 41 toward the accelerator opening direction. The inclined surfaces of the first helical tooth and the second helical tooth abut against each other in the circumferential direction. The first helical tooth and the second helical tooth can transmit mutual rotation thereof between the pedal boss portion 31 and the hysteresis boss portion 41 via the intermediate member 48.

When the rotation angle of the pedal boss portion 31 is located on the accelerator fully opened position side from the accelerator fully closed position, the inclined surfaces of the first helical tooth and the second helical tooth are engaged with each other and separate the pedal boss portion 31 and each of the intermediate member 48 and the hysteresis boss portion 41 from each other. At this time, the first helical tooth pushes the pedal boss portion 31 to the bottom portion 12 side with a larger force as the rotation angle of the pedal boss portion 31 from the accelerator fully closed position is increased. Meanwhile, the second helical tooth pushes the hysteresis boss portion 41 to the first cover 18 side with a larger force as the rotation angle of the pedal boss portion 31 from the accelerator fully closed position is increased.

The second friction member 401 is provided between the hysteresis rotation member 45 and the first cover 18 in the radially outer direction of the shaft 20. The hysteresis rotation member 45 is frictionally engaged with the second friction member 401 when the hysteresis rotation member 45 is pressed in a direction to separate from the pedal boss portion 31, that is, to the first cover 18 side. A friction force between the hysteresis rotation member 45 and the second friction member 401 is rotation resistance of the hysteresis rotation member 45.

The hysteresis spring 49 is a coil spring, for example, and urges the hysteresis rotation member 45 in the accelerator closing direction. An urging force of the hysteresis spring 49 is increased as the rotation angle of the hysteresis boss portion 41 is increased. Torque that is received by the hysteresis boss portion 41 due to urging of the hysteresis spring 49 is transmitted to the pedal boss portion 31 via the second helical teeth and the first helical teeth.

Figure 5:
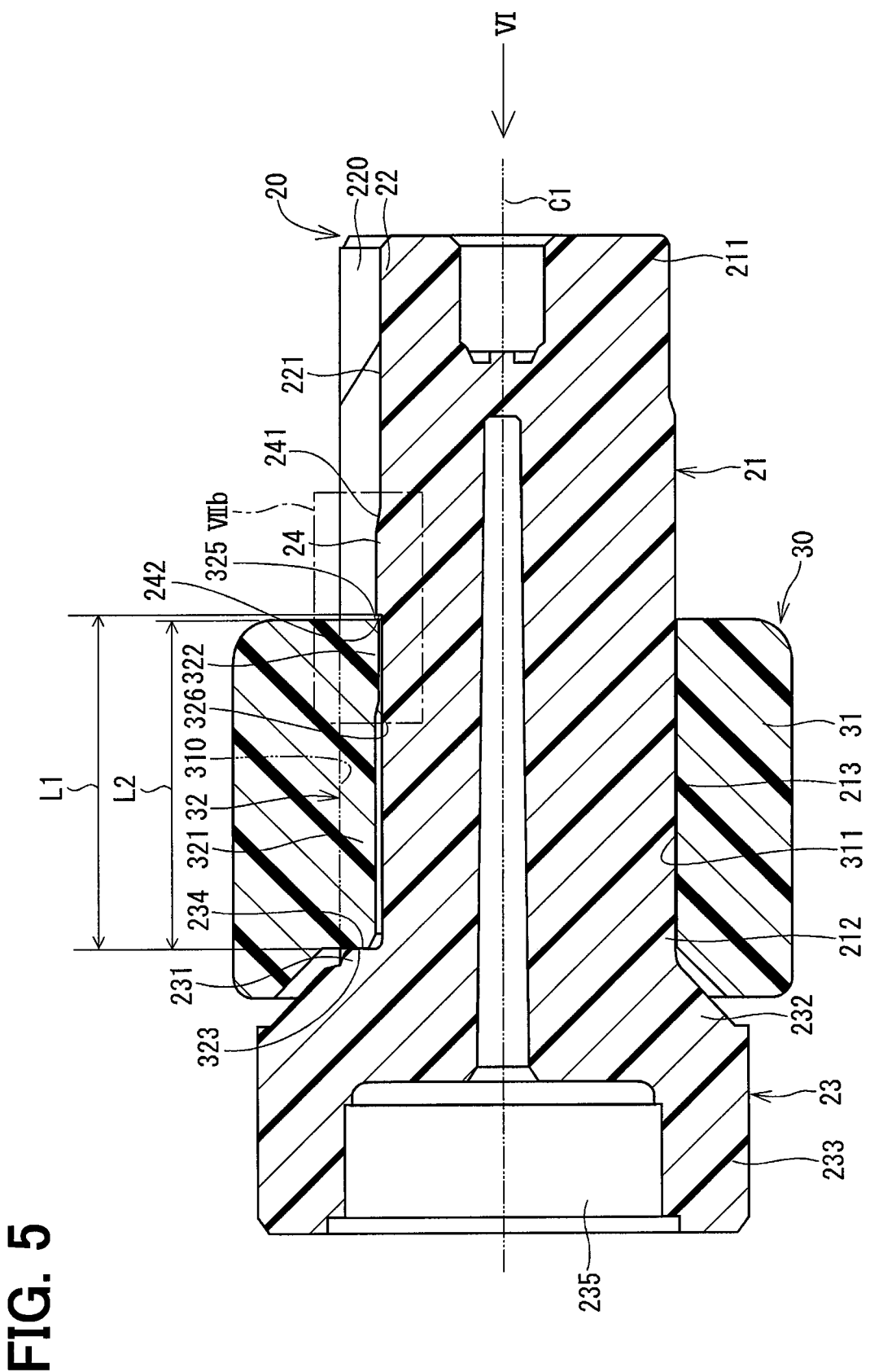
FIG. 5 is a cross-sectional view illustrating a joined state of a shaft and an operation member of the accelerator device according to the first embodiment.
Figure 6:
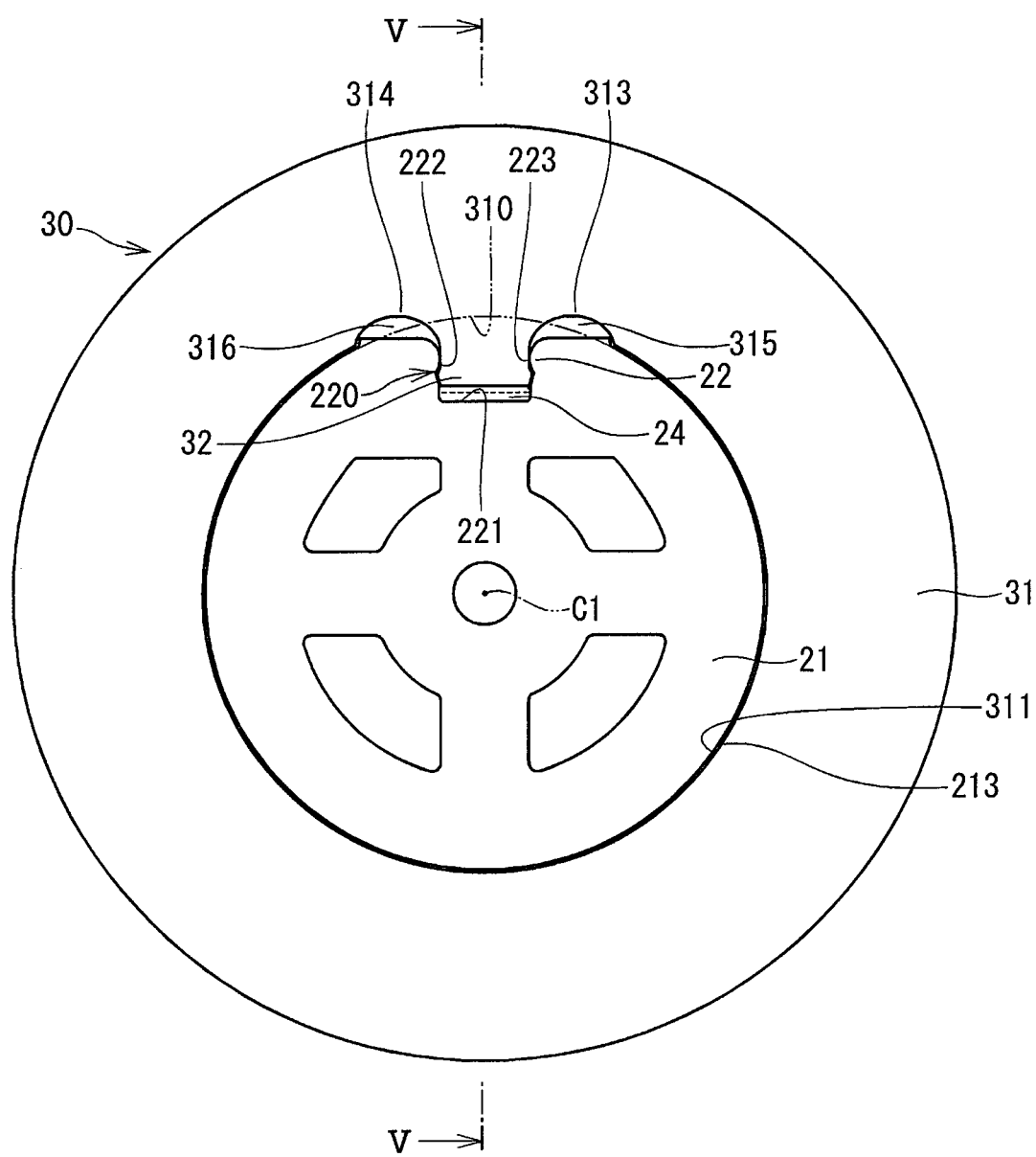
FIG. 6 is a view seen in an arrow VI direction in FIG. 5.

In the accelerator device 1, the shaft 20 and the operation member 30 have characteristic shapes. Accordingly, a detailed description will be made on the shape of the shaft 20, the shape of the operation member 30, and the joined state of the shaft 20 and the operation member 30 primarily on the basis of FIGS. 5 to 7. FIG. 5 is a cross-sectional view of the shaft 20 and the operation member 30 in a state of being press-fitted and joined. For convenience of the description, FIGS. 5 and 6 depict a boundary between the pedal boss portion 31 and the insertion portion 32 in the operation member 30 by a two-dot chain line and depict the two-dot chain line as the inner wall of the insertion hole 310 provided in the pedal boss portion 31.

First, a description will be made on the shape of the shaft 20.

The shaft portion 21 is a substantially rod-shaped portion. The shaft portion 21 is formed such that a cross-sectional shape in a perpendicular direction to the rotation axis C1 is a substantially circular shape (see FIG. 6). The shaft portion 21 is press-fitted to the insertion hole 310. In this way, the shaft 20 and the pedal boss portion 31 are joined and thus can rotate integrally. The shaft portion 21 has an abutment surface 213 on the radially outer side, the abutment surface 213 being "a second abutment surface" that abuts against an inner wall of the pedal boss portion 31 forming the insertion hole 310. One end 211 of the shaft portion 21 is rotatably inserted in a recessed space 180 provided in the first cover 18 (see FIGS. 3 and 4). That is, an inner wall of the first cover 18 that forms the recessed space 180 serves as one bearing of the shaft 20. The other end 212 of the shaft portion 21 is provided with the sensor housing portion 23. The groove portion 22 is provided on the radially outer side of the shaft portion 21.

The groove portion 22 is provided in a portion that is located on the radially outer side of the shaft portion 21 and that differs from the abutment surface 213. The groove portion 22 has a groove 220 that is formed to extend in a rotation axis C1 direction from the one end 211 to the other end 212. The groove portion 22 is provided with the shaft engagement portion 24.

The shaft engagement portion 24 is connected to a bottom surface 221 corresponding to "a wall surface of the groove portion in a radial direction" that forms the groove 220 and to lateral surfaces 222, 223 corresponding to "a wall surface of the groove portion in the circumferential direction" that forms the groove 220. The shaft engagement portion 24 is formed in a manner capable of being engaged with the insertion portion 32 in the rotation axis C1 direction. The shaft engagement portion 24 has an inclined surface 241 at a side opposite from the sensor housing portion 23 in the press-fitting direction. The inclined surface 241 is formed to approach the rotational axis C1 as moving from the sensor housing portion 23 toward the opposite side from the sensor housing portion 23. The shaft engagement portion 24 has an end surface 242, which can abut against the insertion portion 32 provided in the pedal boss portion 31, on the sensor housing portion 23 side.

The sensor housing portion 23 is formed such that an outer diameter thereof is larger than an outer diameter of the shaft portion 21. The sensor housing portion 23 includes a small diameter portion 231, a connecting portion 232, and a large diameter portion 233 in this order from the other end 212 of the shaft portion 21.

The small diameter portion 231 has an end surface 234, which can abut against the pedal boss portion 31, on the shaft engagement portion 24 side.

The connecting portion 232 is formed such that a cross-sectional area, which is perpendicular to the rotation axis C1, is increased toward the large diameter portion 233 from the small diameter portion 231.

The large diameter portion 233 is a bottomed cylindrical portion that has a larger outer diameter than outer diameters of the small diameter portion 231 and the connecting portion 232. The large diameter portion 233 has a space 235 that is opened to the opposite side from the shaft portion 21. The yoke 26 and the magnets 271, 272 are accommodated in the space 235 (see FIGS. 3, 4). The large diameter portion 233 is rotatably inserted in an opening 120 that is provided in the bottom portion 12 (see FIGS. 3, 4). That is, the inner wall of the housing 10 that forms the opening 120 serves as the other bearing of the shaft 20.

Next, a description will be made on the operation member 30, in particular, the shape of the insertion portion 32 that is provided on the inner wall of the pedal boss portion 31.

The insertion portion 32 is provided on an inner wall in a manner to protrude in the radially inner direction, the inner wall differing from an abutment surface 311 corresponding to "a first abutment surface" that is the inner wall of the insertion hole 310 and abuts against the abutment surface 213 of the shaft portion 21. The insertion portion 32 is press-fitted to the groove 220. The insertion portion 32 includes a main body portion 321 and a protruding portion 322.

The main body portion 321 is formed to extend in the rotation axis C1 direction from one opening to the other opening of the insertion hole 310. An end surface 323 of the main body portion 321 adjacent to the sensor housing portion 23 can abut against the end surface 234 of the sensor housing portion 23.

In an end portion of the main body portion 321 on an opposite side from the sensor housing portion 23, the protruding portion 322 is formed to further protrude in the radially inner direction from the main body portion 321. The protruding portion 322 has an end surface 325, which can abut against the end surface 242 of the shaft engagement portion 24, on the opposite side from the sensor housing portion 23. An inclined surface 326 is defined on the protruding portion 322 at a side adjacent to the sensor housing portion 23, and is formed to approach the rotation axis C1 as moving away from the sensor housing portion 23 toward the opposite side from the sensor housing portion 23.

On both sides of the insertion portion 32 in the circumferential direction, a recess 313, 314 is provided as "a gap forming portion". A space 315, 316 is formed as "a gap" between the recess 313, 314 and the outer wall on the radially outer side of the shaft portion 21.

In the accelerator device 1, as depicted in FIG. 5, a distance L1 between the end surface 242 of the shaft engagement portion 24 and the end surface 234 of the sensor housing portion 23 is longer than a length L2 of the main body portion 321 in the rotation axis C1 direction. In addition, as depicted in (b) of FIG. 7, a distance L3 between the bottom surface 221 of the groove 220 and an end surface 327 on the radially inner side of the protruding portion 322 at a time when the shaft 20 is press-fitted to the operation member 30 is shorter than a height H1 of the shaft engagement portion 24 in the radial direction.

Next, a manufacturing process of the accelerator device 1 will be described.

Figure 7:
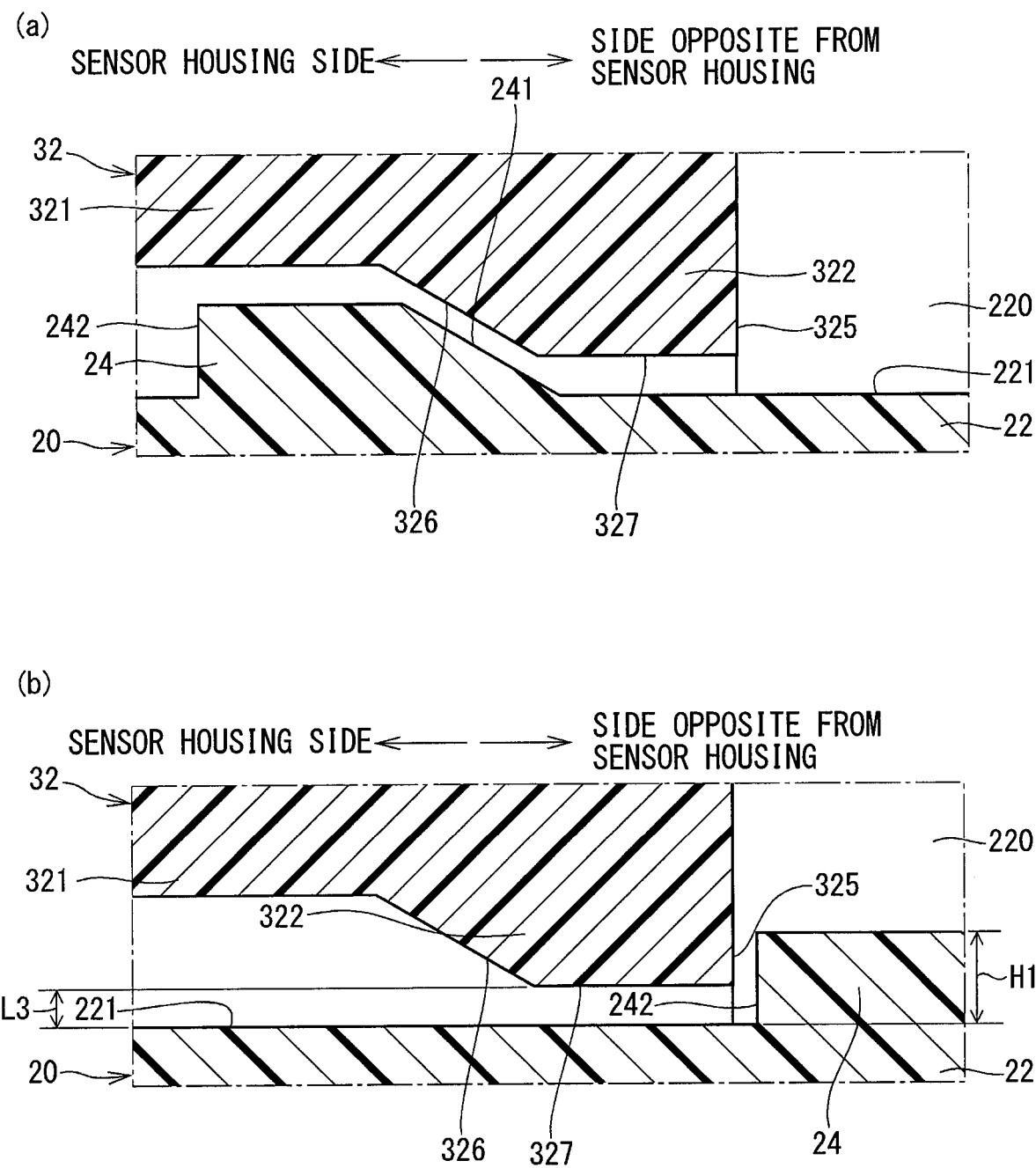
FIG. 7 includes cross-sectional views illustrating a joined portion of the shaft and the operation member of the accelerator device according to the first embodiment, in which (a) is a cross-sectional view illustrating a state where the shaft and the operation member are in the middle of being press-fitted and fixed and (b) is a cross-sectional view corresponding to a VII portion in FIG. 5 after the shaft and the operation member are press-fitted and fixed.

First, the shaft 20 and the operation member 30 are joined by press-fitting. FIG. 7 depicts a situation where the shaft 20 and the operation member 30 are press-fitted and joined. In the first embodiment, when the shaft 20 and the operation member 30 are press-fitted and joined, the shaft portion 21 is inserted in the insertion hole 310 from the one end 211 side.

While the shaft 20 is being press-fitted to the operation member 30, as depicted in (a) of FIG. 7, the protruding portion 322 is located on the opposite side of the shaft engagement portion 24 from the sensor housing portion 23. When the shaft 20 in a state depicted in (a) of FIG. 7 moves in an opposite direction away from the sensor housing portion 23, the inclined surface 241 of the shaft engagement portion 24 abuts against the inclined surface 326 of the protruding portion 322. After the inclined surface 241 abuts against the inclined surface 326, the shaft 20 further moves in the opposite direction away from the sensor housing portion 23. At this time, the protruding portion 322 moves along an outer wall of the shaft engagement portion 24 and is brought into a state in (b) of FIG. 7.

Furthermore, when the shaft 20 moves from the state depicted in (b) of FIG. 7 in a direction in which the shaft engagement portion 24 separates from the protruding portion 322, the end surface 234 of the sensor housing portion 23 abuts against the end surface 323 of the insertion portion 32. In this way, press-fitting and joining of the shaft 20 and the operation member 30 are terminated.

Next, a member as the "joined body" in which the shaft 20 and the operation member 30 are joined is set with the pedal spring 39, the hysteresis mechanism portion 40, and the like in the housing 10. At this time, the sensor housing portion 23 is inserted in the opening 120 of the bottom portion 12.

Next, the first cover 18 and the second cover 19 are assembled to the housing 10. At this time, the one end 211 of the shaft portion 21 is inserted in the recessed space 180.

The rotation angle sensor 25 is assembled to an outer side of the bottom portion 12. At this time, the yoke 26 and the magnets 271, 272 are assembled in the space 235 of the sensor housing portion 23.

Finally, the pedal arm 38 and the accelerator pedal 37 are assembled to the operation member 30, and the accelerator device 1 is completed.

Next, an operation of the accelerator device 1 will be described.

When the accelerator pedal 37 is depressed, the operation member 30 rotates with the shaft 20 about the rotation axis C1 of the shaft 20 in the accelerator opening direction in accordance with a depression force applied to the accelerator pedal 37. At this time, for the rotation of the operation member 30 and the shaft 20, the depression force that generates the higher torque than a sum of the torque generated by the urging forces of the pedal spring 39 and the hysteresis spring 49 and resistance torque generated by the friction forces of the first friction member 301 and the second friction member 401 is necessary.

For example, in order to maintain the depression of the accelerator pedal 37 after the driver depresses the accelerator pedal 37, the depression force that generates the higher torque than a difference between the torque generated by the urging forces of the pedal spring 39 and the hysteresis spring 49 and the resistance torque generated by the friction forces of the first friction member 301 and the second friction member 401 only has to be applied. That is, in the case where the driver attempts to maintain the depression of the accelerator pedal 37 after depressing the accelerator pedal 37, the driver may reduce the depression force to certain extent.

In order to make the depressed accelerator pedal 37 return to the accelerator fully closed position side, the depression force that generates the lower torque than the difference between the torque generated by the urging forces of the pedal spring 39 and the hysteresis spring 49 and the resistance torque generated by the friction forces of the first friction member 301 and the second friction member 401 is applied. When the accelerator pedal 37 is promptly returned to the accelerator fully closed position, the depression of the accelerator pedal 37 only has to be canceled, and thus a burden is not added to the driver. Meanwhile, when the accelerator pedal 37 is gradually returned, the predetermined depression force has to continuously be applied. At this time, the depression force that is required to gradually cancel the depression has a relatively small value.

Conventionally, when two members, such as the shaft 20 and the operation member 30 provided in the accelerator device 1, are press-fitted and joined, in order to increase a joined force of the two members, the restoring force during joining by press-fitting has to be increased, the restoring force being generated when the one member that is press-fitted to the hole provided in the other member attempts to return to the original shape. However, in order to increase the restoring force, the one member has to be increased in size, and thus a press-fitting crack possibly occurs.

(a) In the accelerator device 1, when the shaft 20 and the operation member 30 are joined, the abutment surface 213 of the shaft 20 and the abutment surface 311 of the pedal boss portion 31 abut against each other. That is, the restoring force that is generated by press-fitting of the shaft 20 to the operation member 30 is applied to the abutment surface 213 and the abutment surface 311.

The shaft 20 has the groove 220, to which the insertion portion 32 provided in the pedal boss portion 31 is press-fitted. In this way, the insertion portion 32 is engaged with the groove portion 22. Thus, even when the operation member 30 attempts to rotate relative to the shaft 20, the relative rotation of the operation member 30 to the shaft 20 can be regulated.

The shaft 20 has the shaft engagement portion 24 in the groove 220. Because being formed in the manner capable of being engaged with the insertion portion 32 in the rotation axis C1 direction of the insertion portion 32, the shaft engagement portion 24 can regulate the movement of the operation member 30 in the rotation axis C1 direction relative to the shaft 20.

Just as described, in the accelerator device 1, the groove portion 22, the insertion portion 32 that is engaged with the groove portion 22, and the shaft engagement portion 24 that can be engaged with the insertion portion 32 regulate the rotation and the movement in the rotation axis C1 direction of the operation member 30 relative to the shaft 20. The groove portion 22, the insertion portion 32, and the shaft engagement portion 24 are formed on the different wall surfaces from the abutment surfaces 213, 311, to which the restoring force of the shaft 20 is applied, and thus can regulate the movement of the operation member 30 relative to the shaft 20 without being influenced by a magnitude of the restoring force. Accordingly, the shaft 20 and the operation member 30 can reliably be joined without being influenced by the size of the press-fitted member.

(b) The shaft engagement portion 24 is provided in the groove portion 220. In this way, the shaft 20 and the operation member 30 can be joined without the abutment of the shaft engagement portion 24 and the abutment surface 311. Accordingly, when the shaft 20 is press-fitted to the operation member 30, the shaft 20 and the operation member 30 can be joined without damaging a portion of the operation member 30 having the abutment surface 311. In addition, misalignment of the axes of the shaft 20 and the operation member 30, which is caused by deformation of the portion of the operation member 30 having the abutment surface 311, can be prevented.

(c) The shaft engagement portion 24 is provided to be connected to the bottom surface 221 and the lateral surfaces 222, 223 of the groove 220. In this way, the shaft engagement portion 24 can be made relatively strong and thus can reliably regulate the movement of the operation member 30 in the opposite direction from the sensor housing portion 23.

(d) When the shaft 20 is press-fitted to the insertion hole 310 from the one end 211 side, the shaft 20 moves in the rotation axis C1 direction while the inclined surface 241 of the shaft 20 abuts against the inclined surface 326 of the operation member 30. In this way, when the shaft 20 is press-fitted to the operation member 30, the operation member 30 can easily be located beyond the shaft engagement portion 24. Thus, the shaft 20 can relatively smoothly be press-fitted to the operation member 30.

(e) The sensor housing portion 23 is provided on the opposite side of the insertion portion 32 from the shaft engagement portion 24 in the rotation axis C1 direction. In this way, the shaft engagement portion 24 or the sensor housing portion 23 can regulate both types of movement that are the movement of the operation member 30 in a direction to the sensor housing portion 23 side and the movement thereof in a direction to the opposite side from the sensor housing portion 23.

(f) In case where the shaft 20 is press-fitted to the insertion hole 310 from the one end 211 side, when the insertion portion 32 and the sensor housing portion 23 abut against each other, it is considered that press-fitting of the shaft 20 to the operation member 30 is completed, and the press-fitting process of the shaft 20 is terminated. Just as described, the sensor housing portion 23 and the insertion portion 32 can prevent the excess movement of the shaft 20 in the press-fitting direction at the time when the shaft 20 is press-fitted to the operation member 30. In this way, the operation member 30 that has the insertion portion 32 can have the simple shape while having a function of regulating the rotation and the movement in the rotation axis C1 direction of the operation member 30 relative to the shaft 20 and a function of regulating the excess movement of the shaft 20 in the press-fitting direction during press-fitting. Thus, manufacturing cost of the accelerator device 1 can be reduced.

(g) The spaces 315, 316 are formed on both of the sides of the insertion portion 32 in the circumferential direction. When the shaft 20 and the operation member 30 are press-fitted and joined, a part of the shaft 20, which attempts to return to the original shape, can move to the spaces 315, 316. In this way, damage to the shaft 20 and the operation member 30, which is caused by stress generated by the deformation during press-fitting, can be prevented.

Second Embodiment

A description will be made on an accelerator device according to a second embodiment on the basis of FIG. 8. The second embodiment differs from the first embodiment in terms of the shapes of the shaft and the pedal boss portion. Note that the substantially same portion as that in the first embodiment is denoted by the same reference sign, and the description thereon will not be made.

Figure 8:
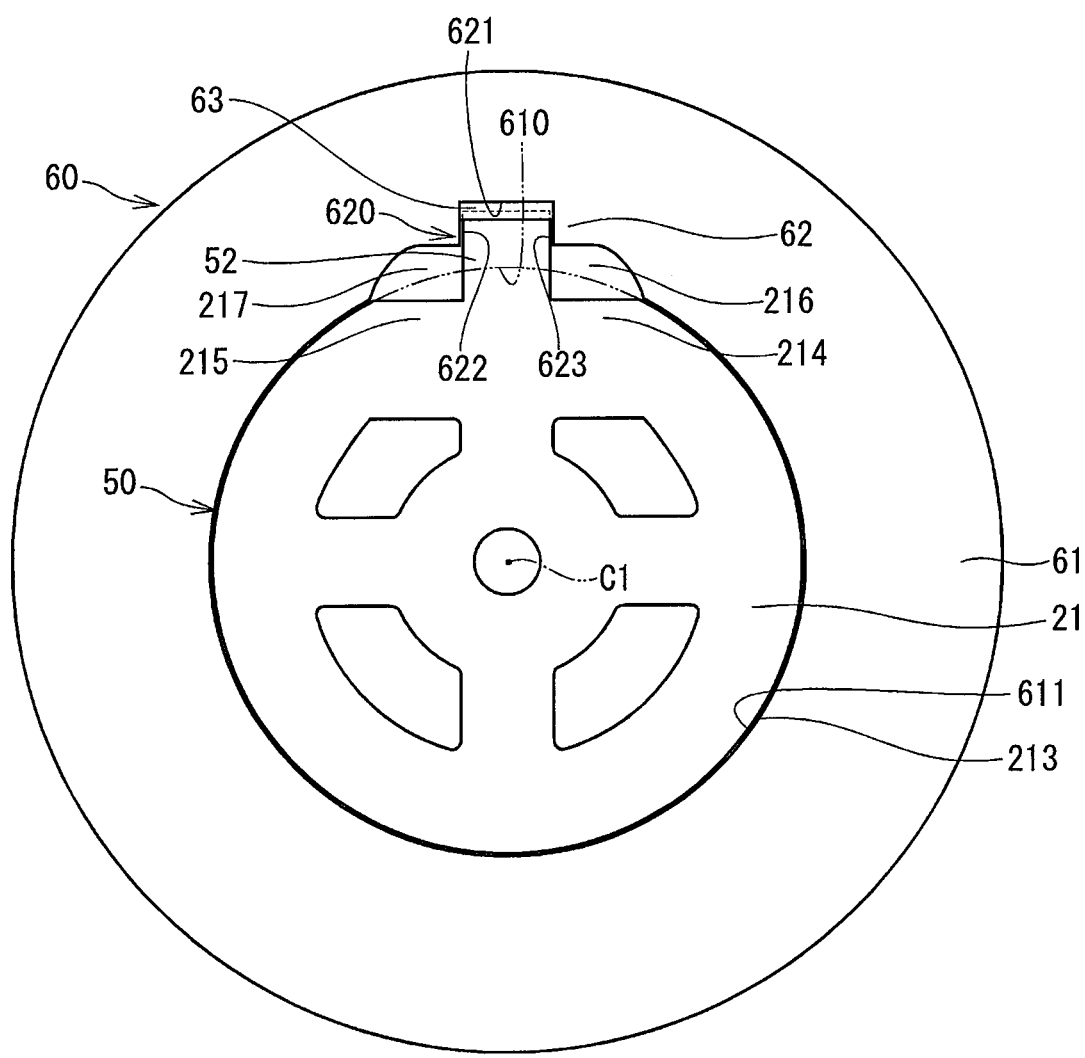
FIG. 8 is a cross-sectional view illustrating a joined state of a shaft and an operation member of an accelerator device according to a second embodiment.

FIG. 8 is a schematic view in which a state where a shaft 50 and a pedal boss portion 61 of an operation member 60 provided in the accelerator device according to the second embodiment are joined is seen from a rotation axis C1 direction. The shaft 50 and the operation member 60 correspond to "a joined body".

The shaft 50 is substantially formed in a rod shape and is rotatably provided in an internal space 100. The shaft 50 has the shaft portion 21, an insertion portion 52, a sensor housing portion 23, and the like. The shaft portion 21, the insertion portion 52, and the sensor housing portion 23 are integrally formed of the resin.

The insertion portion 52 is provided on a different outer wall from an abutment surface 213 that is the outer wall on the radially outer side of the shaft portion 21 and that abuts against an inner wall of an insertion hole 610 as "a hole" provided in the pedal boss portion 61. The insertion portion 52 is inserted in a groove 620 provided in the pedal boss portion 61.

Recesses 214, 215 as "a gap forming portion" are provided on both sides of the insertion portion 52 in the circumferential direction. The recesses 214, 215 are respectively formed with spaces 216, 217 as "a gap" between each of the recesses 214, 215 and the outer wall on the radially outer side of the shaft portion 21.

The operation member 60 includes the pedal boss portion 61, a groove portion 62, a boss engagement portion 63 as "an engagement portion", an arm coupling portion 34, a pedal spring receiving portion 35, a fully closed stopper portion 36, and the like. The pedal boss portion 61, the groove portion 62, the boss engagement portion 63, the arm coupling portion 34, the pedal spring receiving portion 35, and the fully closed stopper portion 36 are integrally formed of the resin.

The pedal boss portion 61 is provided between a bottom portion 12 and a first cover 18. The pedal boss portion 61 is formed annularly and has the insertion hole 610, through which the shaft portion 21 of the shaft 50 can be inserted. The groove portion 62 is provided on the inner wall of the insertion hole 610.

The groove portion 62 is provided on a different inner wall from an inner wall 611 as "a first abutment surface" that is located on the radially inner side of the pedal boss portion 61 and that abuts against the abutment surface 213 of the shaft portion 21. The groove portion 62 has the groove 620 that is formed to extend from one end opening to the other end opening of the insertion hole 610. The groove 620 is provided with the boss engagement portion 63.

The boss engagement portion 63 is provided to be connected to a bottom surface 621 as "a wall surface of the groove portion in the radial direction" that forms the groove 620 and lateral surfaces 622, 623 as "a wall surface of the groove portion in the circumferential direction" that forms the groove 220. The boss engagement portion 63 is formed in the manner capable of being engaged with the insertion portion 52 that is inserted in the groove 620.

In the accelerator device according to the second embodiment, the insertion portion 52 of the shaft 50 is inserted in the groove 620 of the pedal boss portion 61. The operation member 60 has the boss engagement portion 63 that can be engaged with the insertion portion 52 in the rotation axis C1 direction. In this way, movement of the operation member 60 relative to the shaft 50 can be regulated without being influenced by magnitudes of restoring forces of the shaft 50 and the pedal boss portion 61. Thus, the second embodiment exhibits the effects (a) to (c), (e) to (g) of the first embodiment.

Third Embodiment

A description will be made on an accelerator device according to a third embodiment on the basis of FIG. 9. The third embodiment differs from the first embodiment in terms of the shape of the shaft engagement portion. Note that the substantially same portion as that in the first embodiment is denoted by the same reference sign, and the description thereon will not be made.

Figure 9:
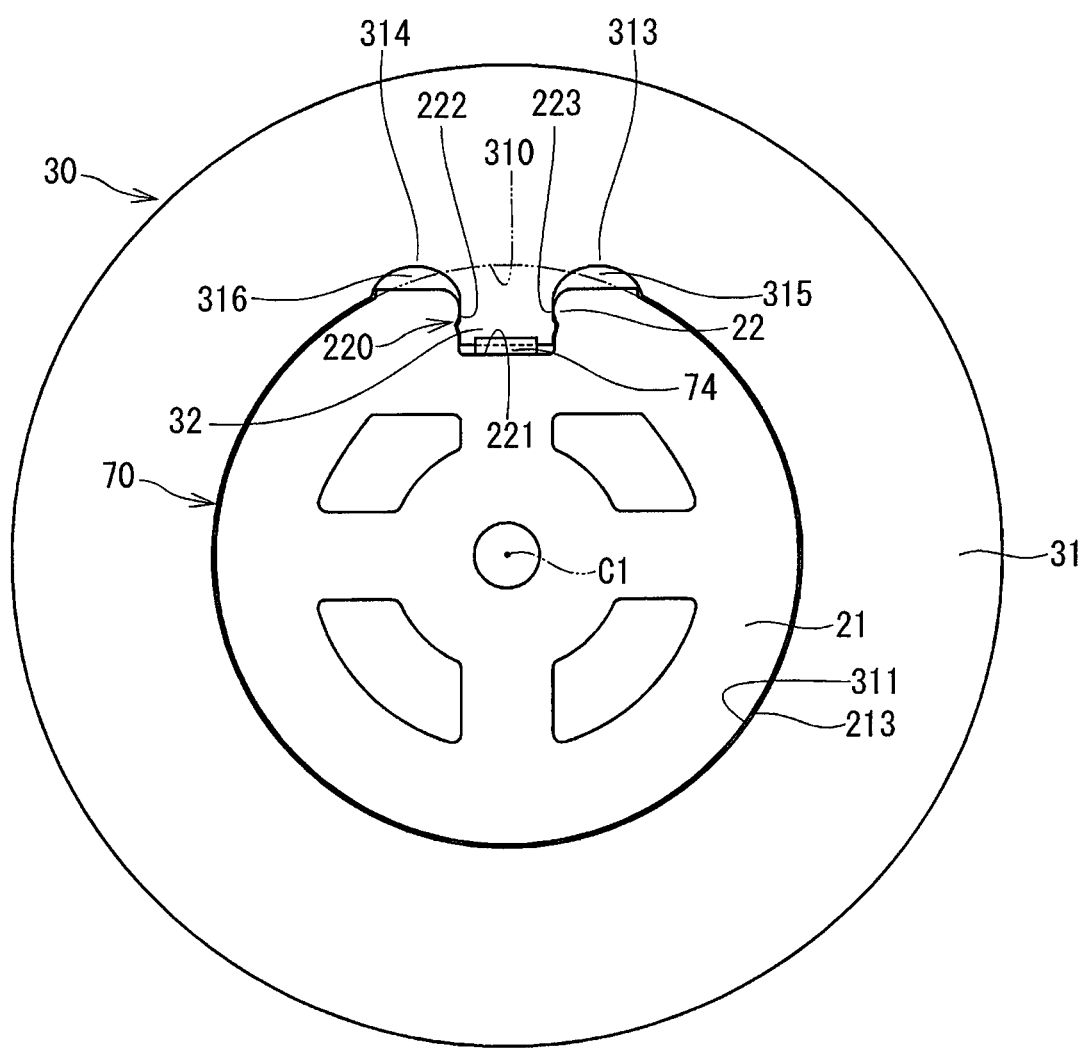
FIG. 9 is a cross-sectional view illustrating a joined state of a shaft and an operation member of an accelerator device according to a third embodiment.

FIG. 9 is a schematic view in which a state where a shaft 70 and a pedal boss portion 31 of an operation member 30 provided in the accelerator device according to the third embodiment are joined is seen from a rotation axis C1 direction. The shaft 70 and the operation member 30 correspond to "a joined body".

The shaft 70 is substantially formed in a rod shape and is rotatably provided in an internal space 100. The shaft 70 has a shaft portion 21, a groove portion 22, a sensor housing portion 23, and a shaft engagement portion 74 as "an engagement portion". The shaft portion 21, the groove portion 22, the sensor housing portion 23, and the shaft engagement portion 74 are integrally formed of the resin.

The shaft engagement portion 74 is formed to be only connected to a bottom surface 221 of the groove portion 22, which forms a groove 220, and to extend in a substantially orthogonal direction to a rotation axis C1. The shaft engagement portion 74 is formed in the manner capable of abutting against an insertion portion 32.

In the third embodiment, the shaft 70 has the shaft engagement portion 74 that is formed to protrude in the radially outer direction from the bottom surface of the groove portion 22 and that can be engaged with the insertion portion 32. In this way, movement of the operation member 30 relative to the shaft 70 can be regulated without being influenced by magnitudes of restoring forces of the shaft 70 and the pedal boss portion 31. Thus, the third embodiment exhibits the effects (a), (b), (e) to (g) of the first embodiment.

Other Embodiments

In the above-described embodiments, the "joined body" is configured by including the shaft and the operation member provided in the accelerator device. However, the device, for which the "joined body" is used, is not limited thereto. The "joined body" may be configured by including a member having a hole and a member press-fitted to the hole, and the two members may be joined by press-fitting.

In the first and second embodiments, the shaft engagement portion is provided to be connected to the bottom surface and the lateral surfaces that form the groove. In the third embodiment, the shaft engagement portion is provided to be only connected to the bottom surface that forms the groove. However, the surface(s) on which the shaft engagement portion is provided is not limited thereto. The shaft engagement portion may be provided to be only connected to the lateral surface that forms the groove. At this time, in order to prevent the misalignment of the axes of the shaft and the operation member, the shaft engagement portion is desirably connected to the two lateral surfaces.

In the first embodiment, when the shaft and the operation member are press-fitted and joined, the shaft and the operation member have the inclined surfaces that abut against each other. However, the inclined surfaces may not be provided. Alternatively, the inclined surface may be provided in either one of the shaft and the operation member.

In the second and third embodiments, the shaft and the operation member may have the inclined surfaces that abut against each other at the time of press-fitting. When the shaft and the operation member have the inclined surfaces in the second embodiment, the inclined surface provided in the insertion portion of the shaft is formed on the opposite side from the boss engagement portion in the manner to separate from the rotation axis as moving toward the boss engagement portion side from the opposite side from the boss engagement portion. The inclined surface provided in the boss engagement portion of the operation member is formed on the opposite side from the insertion portion in a manner to approach the rotation axis as moving toward the insertion portion side from the opposite side from the insertion portion. In this way, the shaft can relatively smoothly be press-fitted to the operation member.

In the above-described embodiments, the recesses are provided on both of the sides of the insertion portion in the circumferential direction, the recesses forming the spaces to which the parts of the shaft and the operation member can move. However, the recesses may not be provided. Alternatively, the number of the recess may be one.

In the above-described embodiments, the main body portion of the insertion portion is press-fitted to the groove. However, the main body portion may not be press-fitted to the groove. When the main body portion is inserted in the groove and the operation member rotates relative to the shaft, the main body portion only has to be able to regulate the relative rotation of the operation member to the shaft.

In the above-described embodiments, the hysteresis mechanism portion is provided. However, the hysteresis mechanism portion may not be provided.

While the desirable embodiment of the present disclosure is described, the present disclosure is not restricted to the embodiment mentioned, and can be implemented with various modification in the range not deviating from the scope of the present disclosure.

The invention claimed is:

1. A joined body comprising:
a pedal having a hole;
a shaft having a second abutment surface abutting against a first abutment surface which is an inner wall of the pedal forming the hole, the shaft being press-fitted to the hole;
a groove portion defined on one of an inner wall of the pedal differing from the first abutment surface and an outer wall of the shaft differing from the second abutment surface, the groove portion having a groove formed to extend in a press-fitting direction of the shaft to the pedal;

an insertion portion formed to protrude in a radial direction from the other of the inner wall of the pedal differing from the first abutment surface and the outer wall of the shaft differing from the second abutment surface, the insertion portion being inserted in the groove; and a protrusion defined in the groove portion, the protrusion protruding from the shaft and able to be engaged with an end portion of the insertion portion in the press-fitting direction; and wherein the insertion portion has an end surface, which is able to abut against an end surface of the protrusion;

the insertion portion has an inclined surface and the protrusion has an inclined surface, and the inclined surfaces are inclined with respect to a longitudinal axis of the shaft;

the end surface of the insertion portion and the end surface of the protrusion are located between the inclined surface of the insertion portion and an inclined surface of the protrusion in the press-fitting direction, the inclined surface of the protrusion is at a side opposite from the insertion portion in the press-fitting direction, the inclined surface of the protrusion being inclined in a radially outer direction of the pedal or in a radially inner direction of the shaft as extending away from the insertion portion, the inclined surface of the insertion portion is at a side opposite from the protrusion in the press-fitting direction, the inclined surface of the insertion portion being inclined in a radially inner direction of the shaft or a radially outer direction of the pedal as extending away from the protrusion; and the second abutment surface continuously abuts against the first abutment surface from one side of the protrusion defined in the groove portion to the opposite side of the protrusion defined in the groove portion in the circumferential direction.

2. The joined body according to claim 1, wherein the protrusion is defined on a wall surface of the groove portion that forms the groove in the radial direction.

3. The joined body according to claim 1, wherein the protrusion is defined on a wall surface of the groove portion that forms the groove in the circumferential direction.

4. The joined body according to claim 1 further comprising: a regulation portion at a location opposite from the protrusion through the insertion portion in the press-fitting direction, the regulation portion being capable of abutting against an end portion of the insertion portion on a side opposite from the protrusion, the regulation portion regulating the insertion portion from moving away from the protrusion.

5. The joined body according to claim 1 further comprising: a gap forming portion on at least one side of the insertion portion in the circumferential direction, the gap forming portion forming a gap between the pedal and the shaft.

6. The joined body according to claim 1, wherein:
the pedal is an accelerator pedal to be depressed by a driver;
a housing is to be attached to a vehicle body;
the joined body is coupled to the accelerator pedal and is rotatably supported by a bearing of the support portion; and
the joined body further comprises:

a rotation angle sensor that detects a rotation angle of the joined body with respect to the support portion and outputs a signal corresponding to the rotation angle of the joined body to outside; and
an urging member that urges rotation of the joined body in an accelerator closing direction.

7. The joined body according to claim 1, wherein
the inclined surface of the protrusion at a side opposite from the insertion portion in the press-fitting direction, the inclined surface of the protrusion being inclined in a radially outer direction of the pedal as extending away from the insertion portion, and
the inclined surface of the insertion portion is at a side opposite from the protrusion in the press-fitting direction, the inclined surface of the insertion portion being inclined in a radially inner direction of the shaft as extending away from the protrusion.

8. The joined body according to claim 1, wherein
the inclined surface of the protrusion is at a side opposite from the insertion portion in the press-fitting direction, the inclined surface of the protrusion being inclined in a radially inner direction of the shaft as extending away from the insertion portion, and
the inclined surface of the insertion portion is at a side opposite from the protrusion in the press-fitting direction, the inclined surface of the insertion portion being inclined in a radially outer direction of the pedal as extending away from the protrusion.

9. The joined body according to claim 1, wherein
a clearance is defined between a bottom surface of the groove portion and the inclined surface of the insertion portion.

10. The joined body according to claim 1, wherein
a distance between a bottom surface of the groove portion and an end surface on a radially inner side of the insertion portion is shorter than a height of the protrusion protruded from the shaft in a radial direction.

11. The joined body according to claim 1, wherein
the inclined surface of the protrusion and the inclined surface of the insertion portion extend parallel to each other.

12. The joined body according to claim 1 further comprising:
a regulation portion at a location opposite from the protrusion through the insertion portion in the press-fitting direction, wherein
the regulation portion being capable of abutting against an end surface of the insertion portion on a side opposite from the protrusion,
the regulation portion regulating the insertion portion from moving away from the protrusion,
a distance between the end surface of the protrusion and an end surface of the regulation portion in contact with the end surface of insertion portion is longer than a length of the insertion portion in the press-fitting direction, and
a distance between a bottom surface of the groove portion and an end surface on a radially inner side of the insertion portion is shorter than a height of the protrusion protruded from the shaft in a radial direction.

13. The joined body according to claim 1, wherein the groove portion is defined on one of the inner wall of the pedal differing from the first abutment surface in the circumferential direction and the outer wall of the shaft differing from the second abutment surface in the circumferential direction.

14. The joined body according to claim 1, wherein the protrusion of the joined body is formed by a single protrusion and the groove portion of the joined body is formed by a single groove portion such that the protrusion defined in the groove portion is formed by the single protrusion defined in the single groove portion in the joined body.

\* \* \* \* \*